Figure 1:
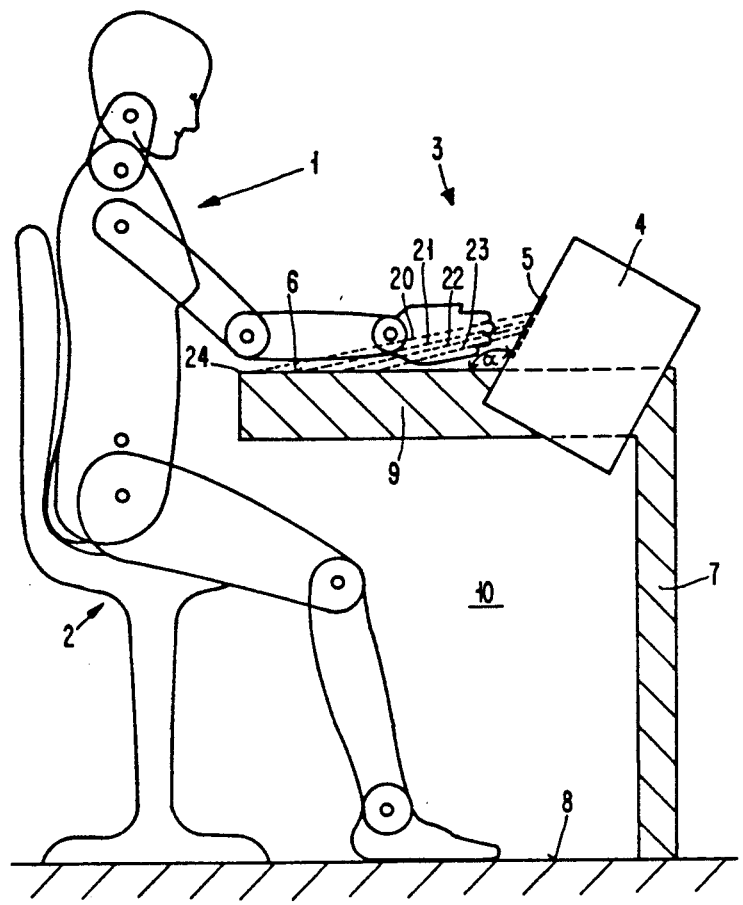

United States Patent [19]

Guber et al.

[11] Patent Number: 5,026,975
[45] Date of Patent: Jun. 25, 1991

[54] BAR CODE LASER SCANNER ARRANGEMENT FOR A CASHIER STAND

[75] Inventors: Wolfgang Guber, Ludwigsburg; Juergen Scheffel, Sindelfingen; Friedrich Wotzka, Herrenberg, all of Fed. Rep. of Germany

[73] Assignee: International Business Machines Corporation, Armonk, N.Y.

[21] Appl. No.: 311,797

[22] Filed: Feb. 17, 1989

[30] Foreign Application Priority Data

Mar. 12, 1988 [EP] European Pat. Off. ........... 88103955

[51] Int. Cl.⁵ .............................................. G06K 7/10
[52] U.S. Cl. .................................. 235/462; 235/454; 235/470; 186/60; 186/61
[58] Field of Search ............... 235/462, 383, 385, 439, 235/454, 467, 470, 475, 82; 186/60-62

[56] References Cited

U.S. PATENT DOCUMENTS

| | | |
|---|---|---|
| 3,783,273 | 1/1974 | Strohschneider . |
| 3,899,687 | 8/1975 | Jones ............................... 235/454 X |
| 4,369,361 | 1/1983 | Swartz et al. .................... 235/462 X |
| 4,652,732 | 3/1987 | Nickl . |

FOREIGN PATENT DOCUMENTS 0122126 10/1984 European Pat. Off. .

OTHER PUBLICATIONS

Patent Abstracts of Japan, Jan. 1984, 59-3591.

Primary Examiner—Stuart S. Levy
Assistant Examiner—Steven M. duBois
Attorney, Agent, or Firm—Joscelyn G. Cockburn

[57] ABSTRACT

The invention provides an arrangement for scanning bar codes applied to articles, such as UPC or EAN codes of goods in a supermarket cashier stand. A laser scanner is provided with a window through which the scanning rays exit before they impinge on a scanning area (11). The laser scanner (4) is arranged at the side of the transport flow and with its window (5) tilted to the rear and being above the transport plane (6). The different rays (20-23, 25-25c, 26-26c, 30a-30f, 31a-31f) of the cluster of scanning rays of scanner (4) are oriented such that they are concentrated and focused mainly on the scanning area (11) in front of the window (5), that they do not leave the transport plane (6) immediately opposite the window, and that generally a ray-free area is formed there where at least head and chest of an operating cashier (1) that sits opposite to the scanner (4) with its window (5), is situated. This arrangement, in which, for example, a laser scanner, such as the IBM 3687 model 002 laser scanner, can be used, ensures that the operating cashier sitting in front of the cash stand and essentially opposite of the scanning window is not struck by any ray of the cluster of scanning rays. This improves the acceptance of such an arrangement within the market place considerably.

9 Claims, 4 Drawing Sheets

BAR CODE LASER SCANNER ARRANGEMENT FOR A CASHIER STAND

DESCRIPTION

The present invention relates to an arrangement for scanning bar codes such as the Universal Product Code or European Article Number Code on goods in a supermarket cashier stand. The arrangement includes a laser scanner containing a window through which a cluster of scanning rays exit before impinging on a scanning area, said window of said laser scanner being arranged at the side of the transport flow of the goods, said window being also arranged above the transport plane of the goods, and the plane of said window being tilted outward with respect to said transport flow such that it includes an angel of more than 90 degrees with said transport plane.

Such an arrangement is known for example from the U.S. Pat. No. 4,652,732. This patent specification describes an apparatus for scanning a bar code affixed to an object and providing an electrical signal indicative of the scanned bar code. The apparatus includes a housing having a base portion and a window portion with the window portion being mounted above a rear section of the base portion. A forward section of the base portion has a flat top surface while the window portion has an optically transmissive window mounted in a side facing the top surface. The region above the top surface and adjacent the window defines a scanning region. Means are mounted within the housing for generating first, second and third scan patterns each comprised of a plurality of substantially parallel spaced apart light scan lines. The first scan pattern scan lines each enter the scanning region through the window at planes each at a predetermined angle from planes parallel to the top surface. The third scan pattern scan lines each enter the scanning region through the window at planes each at a second predetermined angle from planes parallel to the top surface. The second scan pattern scan lines each enter the scanning region through the window at planes each substantially perpendicular to the plane of the top surface. The second scan pattern scan lines are oriented along the window for entering the scanning region between the first and second scan pattern scan lines. Means are included for detecting light reflected from the bar code affixed to an object being scanned within the scanning region back through the window. The means for detection light detects the reflected light having at least a predetermined intensity and provides an electrical signal in response thereto. Means are included for directing the reflective light from a bar code affixed to an object within the scanning region to the means for detecting light.

This known apparatus solves in a way an important object. It provides a possibility that an operating cashier can sit opposite of the scanning window and can have in the sitting position its knees and legs beneath the scanning apparatus and the scanning area. Thus the working place for the operating cashier can be immediately in front of the window and in front of the person itself.

An important question with laser scanning apparatus is the acceptance of the customers and of the operating personnel. Both do not wish that the laser rays impinge on them, especially impinge in their face and eyes.

The laser scanning apparatus from the said U.S. Pat. No. 4,652,732 includes a scan pattern having scan lines that enter the scanning region through the window at planes each substantially perpendicular to the plane of the top surface. These scan lines in vertical oriented planes exit the window about in the middle between the other two scan lines patterns. Thus it is unavoidable that an operating person sitting opposite of the scanning window and sitting in front of the scanning region, is struck by at least part of the scanning rays emanating from the laser scanner. In quite a lot of countries the question of acceptance is a very important one and even are sometimes defined in minimal requirements for cashier work stations by official authorities. Thus security and also ergonomic points of view are of extreme importance.

It is therefore an object of the present invention to provide a cashier working station with a laser scanner for scanning bar codes off the goods in which high security and ergonomic requirements are fulfilled. Especially an operating cashier sitting in front of the working station should have enough room for his/her knees and legs and should not be hit by laser scanning rays emanating from the laser scanner. On the other hand the scanning area should be arranged optimally for the cashier out of ergonomic reasons.

These and other objects are solved in an advantageous manner by the invention as basically described hereafter.

In accordance with the present invention in advantageous manner the operating person sitting in front of the scanning area and sitting essentially opposite the scanning window of the laser scanner, has room enough for knees and legs underneath the scanning place so that she or he has an ergonomically optimal working station to perform her or his scanning work. By special arrangement in accordance to the invention this person is not struck by scanning rays as the cluster of the scanning rays is directed such that it mainly is focused and directed to the scanning area and does not leave the transport plane immediately opposite the scanning area, that is the place where the operating person is sitting. Furthermore the invention provides a ray free area where the operating person is sitting, so that neither head nor chest is struck by any ray. This all together provides out of security as well as ergonomic points of use an optimal working place which fulfills requirements setup by official authorities and provides the necessary acceptance in the market place. The arrangement for scanning bar codes applied to articles, especially for scanning Universal Product Code (UPC) or European Article Number Code (UAN) affixed to goods in a supermarket cashier stand (3) including a laser scanner (4) containing a window (5) through which exists a cluster of scanning rays (20–23, 25–25c, 26–26c, 30a–30f, 31a–31f) before impinging on a scanning area (11), said window of said laser scanner being arranged at the side of the transport flow of the goods, said window being also arranged above the transport plane (6) of the goods, and the plane of said window being tilted outward with respect to said transport flow such that it includes an angle ($\alpha$) of more than 90° with said transport plane; the configuration causes the different rays of said cluster for scanning rays to be oriented such that they (a) are concentrated and focused mainly on the scanning area (11) in front of the window (5), (b) do not leave the transport plane (6) area immediately opposite said window, (c) generally form a ray-free area there where at least head and chest of an operating cashier (1) sitting in front of said scanning area (11) are situated, (d) such that at least said parts of the body of said operating cashier sitting in front of said scanning area and essentially opposite said window is not struck by any ray of said cluster of scanning rays.

Figure 2:
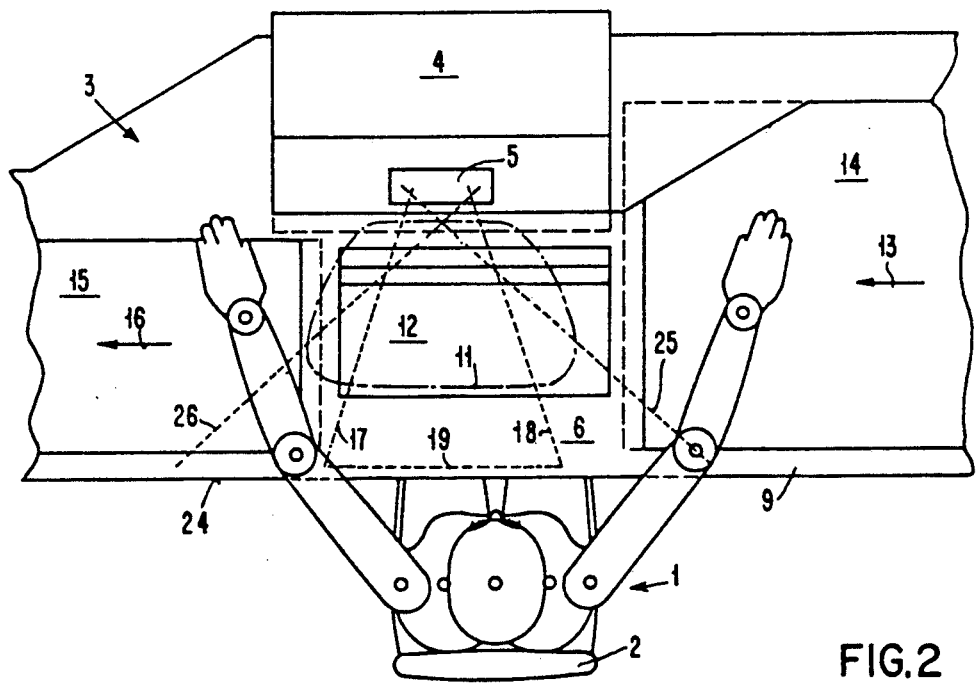
Figure 3:
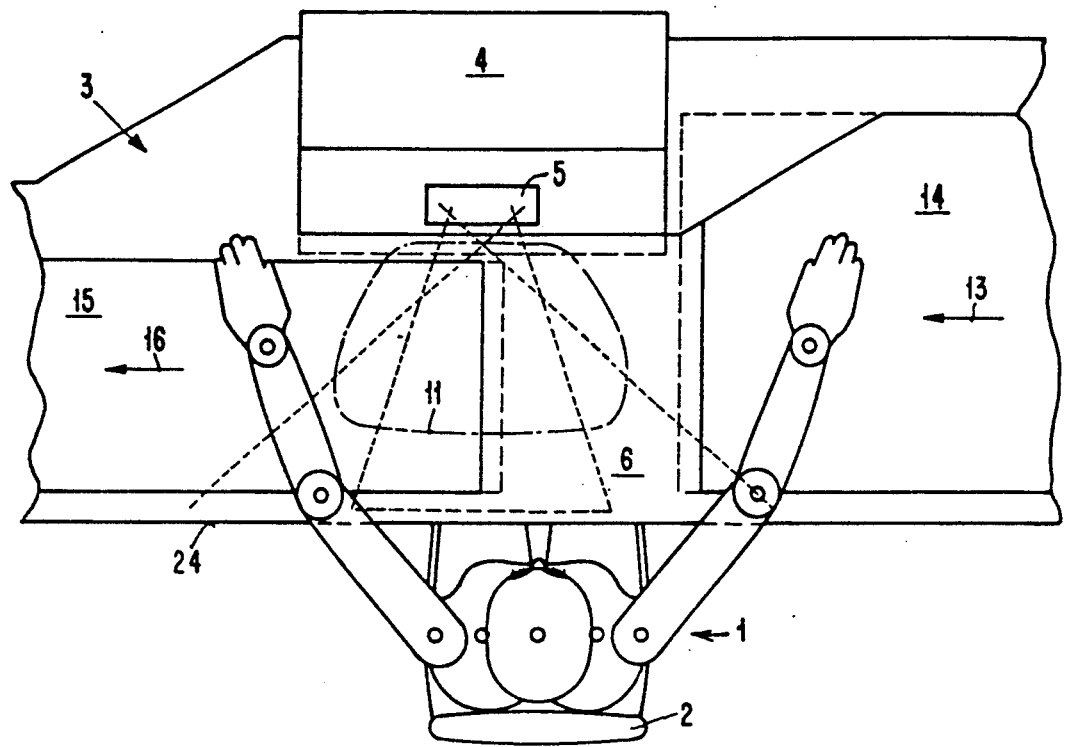
Figure 4:
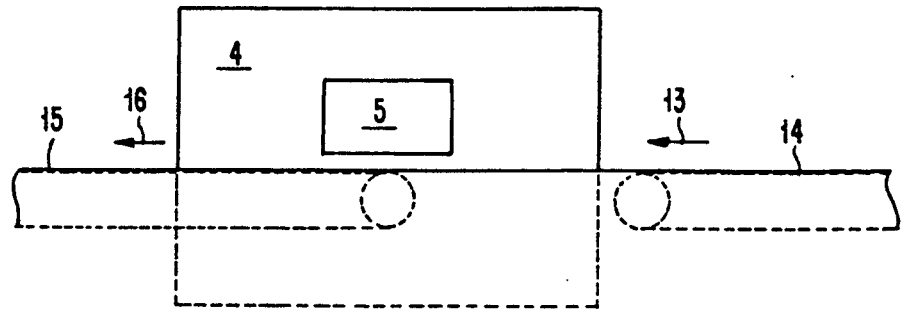

The invention will be described in more detail in accordance with the following specific description and in connection with the drawing showing embodiments of the present invention. In the drawing the different Figures show the following:

FIG. 1 schematically in a sectional side view the scanner built-in to a cashier work station in accordance with the present invention;

FIG. 2 schematically a top view of the scanner arranged in a cashier work station in accordance with the present invention, showing a built-in cash drawer in the scanning area;

FIG. 3 schematically a top view similar as that of FIG. 2, but showing one conveyor belt reaching into the middle of the scanning region;

FIG. 4 showing schematically in a front side view the arrangement of FIG. 3;

FIG. 5A–5D schematically the ray cluster emanating from the scanner window; and

Figure 6:
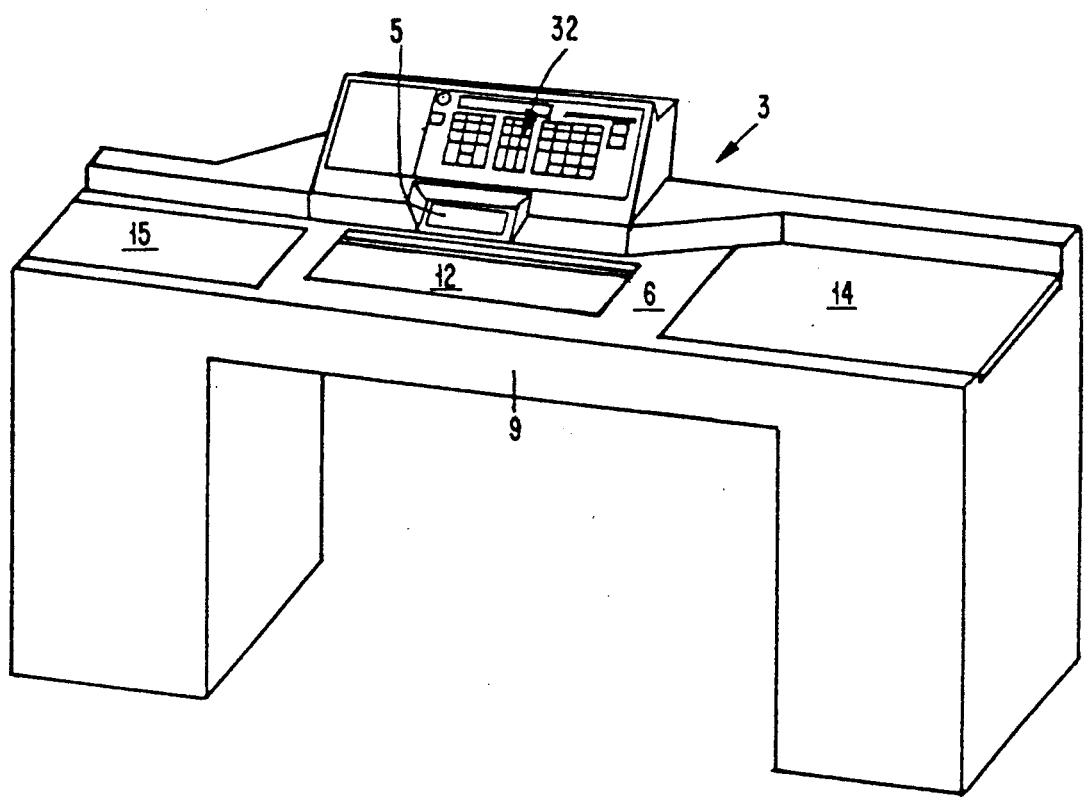

FIG. 6 schematically an isometric view of the cashier stand including the present invention.

As shown in FIG. 1 schematically, a cashier 1 is sitting on a chair 2 in front of a cashier stand 3. Built in the cashier stand 3 there is provided a scanner 4. Scanner 4 is provided at the side of the transport flow and is tilted such that its window 5 includes an angle α between 110° and 130°, preferably 120° with the surface 6 that is horizontal and forms the transport plane on which the goods are transported and on which the scanning area is situated. Cashier stand 3 also includes a support 7 resting on floor 8 to which it is fixed by not shown means.

As shown in FIG. 1, underneath part 9 on which surface 6 the scanning area and the working space for the cashier 1 is situated, a room 10 for the legs and knees of the cashier 1 is given.

FIG. 2 shows a top view of the scanner 4 built-in to the cashier stand 3. In front of the scanner window 5 a scanning area 11, shown by an encircling dotted line is formed on the surface 6. In front of the cashier 1 and in front of the scanner 4 there is built-in a cash drawer 12 into surface 6. Thus the operating cashier sitting in front of table optimally oriented working station. The goods to be scanned are transported to the scanning area 11 in accordance to arrow 13 from right to left with a wide conveyor belt 14. The goods to be scanned are usually taken with the right hand by the operation cashier 1 and overhanded to the left hand in a way that the bar code can be read quickly by the scanning cluster exiting from window 5. Then the left hand sets the article on a second conveyor belt 15 transporting the articles in accordance to arrow 16 away form scanning area 11. Thus the transport flow follows from right to left the direction as indicated by arrows 13 and 16.

The bar codes applied to the goods are most effectively scanned in the encircled scanning area 11. To that purpose a certain ray cluster exits from scanner 4 through scanner window 5. Of those ray cluster in FIG. 2 some edge rays are indicated in small dotted lines. The two inner small dotted lines 17 and 18 indicate together with line 19 the edges of the upper most plane 20 (see FIG. 1) of the pattern having scanning planes exiting scanner 4 through window 5 in a plane parallel to surface 6 and inclined toward it, as shown with plane 20 in FIG. 1. This certain scanning pattern furthermore includes planes 21, 22 and 23 which are all reaching not as far as plane 20 reaches. Thus this ray cluster is concentrated, focused, and directed directly onto the scanning area 11 and in the area immediately between scanning window 5 and operating cashier 1. Decisive is, as indicated by line 19 in FIG. 2 and plane 20 in FIG. 1 that those rays do not leave surface 6 and edge 24 of table 9. Thus by these rays neither head nor chest of the operating cashier 1 is struck.

In FIG. 2 there are furthermore indicated small dotted lines 25 and 26. Those lines indicate the inner most planes of scanning ray clusters emanating from scanner 4 through scanning window 5 in different scanning planes. The exact direction is later on explained in more details in connection with FIG. 5A to 5D. As these lines 25 and 26 indicate, the operating cashier 1 is sitting in an essentially ray free area.

In FIG. 3 a top view is shown schematically similar to that of FIG. 2. The main difference is that there is no cash drawer provided in the surface 6. This is because the conveyor belt 16 is arranged much closer to the conveyor belt 14, compared to the arrangement as shown in FIG. 2. The end of the conveyor belt 15 which transports articles away from the scanning area 11 after scanning, or even already during scanning, starts already about in the middle of the scanning window 5. This arrangement provides a much easier work for the operating cashier 1 sitting in front of the cashier stand 3. This is because the operating cashier 1 has to move the articles to be scanned only a very small distance from the delivering conveyor belt 14 to the departure conveyor belt 15.

In FIG. 4 the arrangement of FIG. 3 is shown schematically in a side view, depicting how the conveyor belt 14 transports goods from right to left in accordance with arrow 13 to the area in front of scanner 4 and especially in front of scanning window 5. Then the goods already are transported by putting them on departing conveyor belt 15 in direction of arrow 16, although from right to left immediately in front of the scanner 4 and already in front of the left half of scanning window 5.

It is clear that a similar arrangement to that shown in FIG. 3 and FIG. 4 could bring the delivering conveyor belt 14 even closer to the departing conveyor belt 15. It is conceivable that both conveyor belts nearly touch each other. The only point to consider here is that the labels carrying the bar code to be scanned have to be turned so that the scanning cluster emanating from scanning window 5 successfully scan the for code. For that action of turning or twisting the operating cashier has to arrange the goods in the appropriate manner.

In connection with FIG. 5, consisting of four Figures. FIGS. 5A to FIGS. 5D7 the ray cluster and its predominantly impinging on the scanning area 11 and the surface 6 will be described.

Figure 5A:
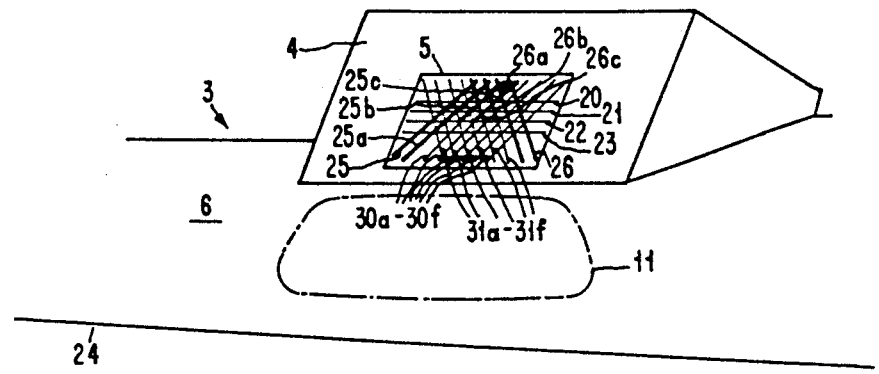

FIG. 5A shows schematically in a slightly isometic view the scanner 4 with its scanning window 5 built-in to cashier stand 3. In front of the scanning window there is the surface 6 on which the scanning area 11 is depicted. Emanating from scanner 4 through window 5 there are seven different ray patterns. One ray pattern consists of rays scanning in planes indicated by lines 20, 21, 22 and 23 in the horizontal in FIG. 5A. Then there is the cluster of two long rays 25 and 25a showing from right above to left down in FIG. 5A and parallel thereto two short lines 25b and 25c indicating two more scanning planes and light emanating in these planes. Arranged mirror like hereto are two long lines 26 and 26a showing from left above to right below and parallel thereto two parallel planes indicated by thick lines 26b and 26c. Then furthermore there are two more clusters. One cluster depicted with six lines 30a to 30f showing from right above to left below and mirror like thereto six more scanning planes depicted by lines 31a to 31f.

Figure 5B:
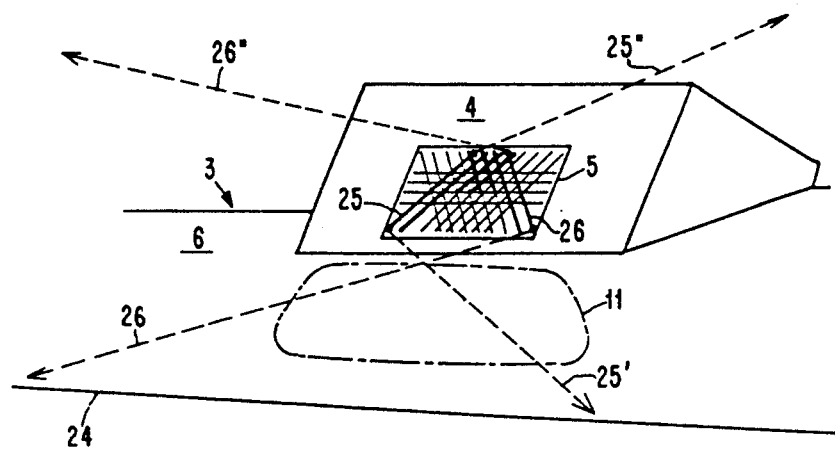

In FIG. 5B now there is depicted schematically only the plane of cluster 25 and 26. That means line 25 is one part of a plane that is furthermore indicated by line 25' and 25" that means that light having a foot print like the line 25 on the window 5 of scanner 4 emanates in the plane indicated by the two arrow lines 25' and 25". In parallel thereto, but not shown are three more planes in which scanning light emanates from window 5. Those are the ones which were indicated with their foot line by reference numbers 25a, 25b and 25c in FIG. 5A.

Also shown in FIG. 5B is the line 26 indicating the foot print line of light emanating from scanner 4 through window 5 and scanning in the plane which is furthermore indicated by lines 26' and 26". Again with 26, 26' and 26" the further most right inclined scanning plane is depicted having with line 26' the inner most line indicating the inner edge of light that emanates through window 5 and does not only impinge on surface 6 of cashier stand 3 but also leaves the stand 3. Thus an operator sitting in front of surface 6 opposite to scanner 4 with window 5 is not struck by light scanning in the plane given by line 26, line 26' and 26". The same is true for light emanating in the plane given by line 25 and lines 25' and 25". As light emanating in the planes parallel thereto and indicated by reference numbers 25a, 25b and 25c as well as 26a, 26b and 26c, light emanating in those planes is still further away from an operator sitting opposite the scanning window 5 because the planes do lie behind the afore mentioned planes with line 25 or line 26 respectively.

Figure 5C:
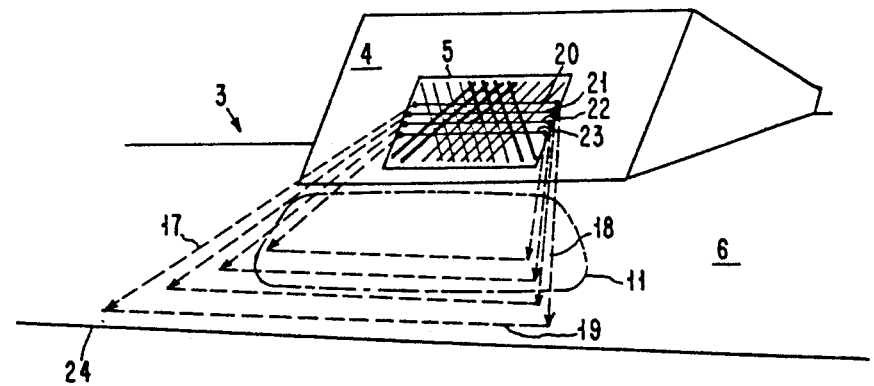

In FIG. 5C the planes are depicted in which light emanates from scanner 4 through window 5 onto surface 6 that has parallel lines 20, 21, 22 and 23 on scanner window 5. Only the upper most plane is carrying reference numbers and this plane is given by line 20 together with the side lines 17 and 18 and the front line 19. The planes corresponding to the foot lines 21, 22, and 23 are underneath the plane which is given by the lines 17 to 20. Thus all the light scanning in those four planes is focused on the surface 6 and thus does not strike an operator sitting opposite scanning window 5 and scanner 4. On the other hand that means that the scanning rays which scan in these planes is concentrated on the scanning area 11 and does not leave the surface 6 of cashier stand 3.

Figure 5D:
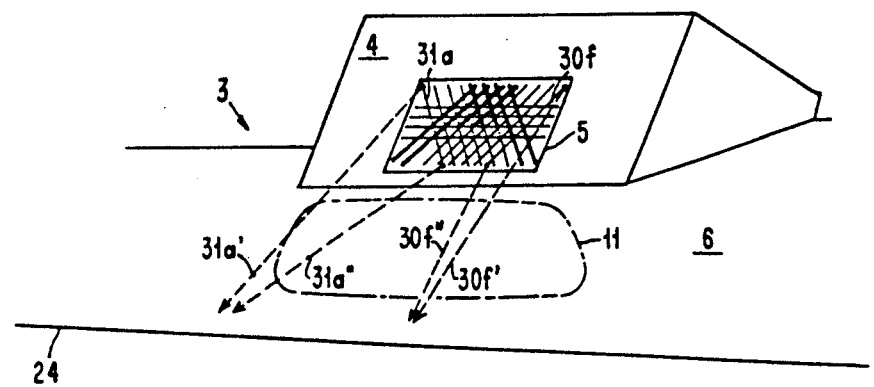

FIG. 5D now shows the planes in which a still further cluster of rays scans. One example for such an inclined plane is given by foot line 30f and the two arrows 30f' and 30f''. Light emanating in this plane and the planes parallel thereto, that are given by the foot lines 30a to 30e in FIG. 5A does not leave the surface 6 of stand 3 and is concentrated predominantly on the scanning area 11.

FIG. 5D shows in mirror like way with foot line 31a and the two lines 31a' and 31a" an example of the other plane in which scanning light emanates in that cluster.

Parallel thereto there are five more planes which are indicated by the foot lines 31b to 30f in FIG. 5A.

Thus rays scanning in the planes indicated by foot lines 20 to 23 and by the foot lines 30a to 30f and 31a to 30f is focused and concentrated mainly on the scanning area 11 on surface 6 of stand 3 and does not leave the stand 3. That means that by those rays that emanate in the direction toward the operating cashier 1 sitting opposite scanner 4 and window 5, that cashier 1 is not hit as those rays do not leave surface 6.

Light scanning in the planes indicated by the foot lines 25, 25a, 25b and 25c as well as scanning in the mirror like planes that are indicated by the foot lines 26, 26a, 26b and 26c is directed in such a way to the side that the operating cashier 1 sitting opposite the window 5 of scanner 4 is not struck at least at its head or chest by those scanning rays. These all together form the basis for a much better acceptance of a scanning apparatus then the known installations. It is very important that the operating cashier can be sure not to be struck by scanning laser beams.

FIG. 6 shows in a isometric view schematically a cashier stand 3 in accordance with the present invention. Within surface 6 of table 9 there is built in a cash drawer 12 over which on the side of the transport flow of the goods from conveyor belt 14 to conveyor belt 15 goods are transported. Above scanner window 5 there is provided a keyboard 32 by which an operator can key in information.

To built a cashier stand like the one schematically shown in FIG. 1, FIG. 2, FIG. 3 or FIG. 6 having a scanning ray cluster as that explained in connection with FIG. 5, there can be used as laser scanner an IBM 3687 model 002 laser scanner that is already on the market or a conventional laser scanner with an equivalent or comparable scanning ray cluster. If this known laser scanner is built in to a cashier stand at the side of the transport flow with the scanning window above the transport plane or scanning area plane and tilted to the rear so that the plane of its scanning window 5 includes an angle $\alpha$ with the surface 6 of the transport plane of about 110° to 130°, preferably 120°, then the ray cluster in accordance with the invention is given. In that instant the length axis of the scanning window of the said scanner is arranged parallel to the transport flow of the goods, i.e. along the direction of arrows 13 and 16.

To have an ergonomically optimal working place for the operating cashier 1 sitting in front of the cashier stand 3 the arrangement is made preferably such, that the position of scanning window 5 relative to the position of the operating cashier is such that the left shoulder of the operating cashier 1 is approximately directly opposite of the scanning window 5. This is shown for example in the top view of FIG. 2 and the top view of FIG. 3 as well as in the isometric view of FIG. 6. In accordance to FIG. 2 and FIG. 6 it can be seen, that the cash drawer 12 is arranged symmetrically to the operating cashier 1 whereas the scanning window 5 relative thereto is arranged a bit further to the left. In accordance with FIG. 3 the surface 6 immediately in front of the operating cashier 1 is slightly to the right of the scanning window 5 so that the left shoulder of the operating cashier 1 is approximately directly opposite window 5. It has been proven by several tests that such an arrangement is optimal in view of ergonomic point of use for best performing of the operating cashier. That also means that in this arrangement work is less tiring for the operating cashier.

We claim:

1. An improved cashier work station for use in a business establishment or the like comprising in combination:
- a cashier stand having an opening for receiving legs and knees of an operator seated on a chair or the like and a flat top surface positioned above the legs and knees of said operator; said flat top surface including a front section disposed in close proximity to the operator and forming a horizontal transport plane (6) upon which goods with affixed bar codes are being transported and a rear section contiguous with the front section; and
- a scanner having a scan window (5) through which a cluster of scanning rays for scanning the bar codes are being emitted;
- said scanner is mounted on the rear section with the scan window (5) inclined at an angle between 110° and 130° relative to the horizontal transport plane thereby causing the scanning rays exiting from the windows to
  a) concentrate and focus mainly on a scanning area in front of the window (5),
  b) not leave the transport plane (6) area immediately opposite said window, and
  c) generally form a ray-free area whereat at least head and chest of an operating cashier (1) sitting in front of said scanning area (11) are situated.

2. Arrangement as in claim 1, wherein said cluster of scanning rays includes essentially two rays inclined in two different planes (25-25c, 30a-30f; 26-26c, 31a-31f) toward the transport plane (6) and one ray (20-23) essentially parallel as well as inclined towards said transport plane.

3. Arrangement as in claim 1 or 2, wherein the scanning area in front of said window in relation to the main sitting position of said sitting operating cashier is arranged such that one shoulder, preferably the left one, of said cashier is essentially directly opposite said window.

4. Arrangement as in any one of claim 1 or 2, wherein the scanner includes an IBM 3687 model 002 laser scanner positioned so that its rectangular window (5) is arranged
  a) with its longitudinal axis in parallel to the direction (13, 16) of said transport flow, and
  b) that the plane of said window includes an angle 120° with the horizontal transport plane (6).

5. Arrangement as in any one of claims 1 or 2, wherein a cash drawer (12) is built-in in said scanning area (11).

6. Arrangement as in claim 5, wherein conveyor belts (14, 15) for transporting goods to be scanned are arranged on either side of said cash drawer (12).

7. Arrangement as in claim 6, wherein conveyor belts (14, 15) are arranged such that they nearly touch each other immediately in front of said window within said scanning area.

8. An improved arrangement for scanning bar codes such as Universal Product Code for European Article Number Codes which are affixed to articles comprising:
- a support means having a flat surface which defines a horizontal transport plane over which articles carrying bar codes are being transported; and
- a laser scanner mounted on a rear section of said flat surface; said laser scanner orientated so that its scan window (5) is disposed above and at an angle greater than 90° with the horizontal transport plane whereby a cluster of rays, for scanning said bar code, exiting said widow impinges on a scanning area (11), through which the article is transported, and do not enter a ray-free area located in front of said scanning area and essentially opposite said window.

9. A method for mounting a laser scanner, such as the IBM 3687 mode 002 laser scanner (4) or a scanner with an equivalent or comparable scanning ray cluster, in a supermarket cashier stand (3) for scanning bar codes affixed to articles comprising the steps of:
  (a) placing the laser scanner in the cashier stand so that (i) its rectangular window through which scanning rays emanate is above and sideways of a transport or scanning area plane (6) which is parallel with said cashier stand, (ii) a longitudinal axis of said rectangular window is parallel to directions (13, 16) of the transport or scanning area plane, (iii) the plane of said window is tilted such that it includes an angle ($\alpha$) of 110° to 130°, preferably 120°; with said transport or scanning area plane; and
  (b) activating said scanner whereby the ray cluster emanating from said scanner through said window does not, at least, strike head or chester of an operating cashier (1) sitting in front of a scanning area (2) and essentially opposite said window.

* * * * *